United States Patent [19]
Merk

[11] 3,885,230
[45] May 20, 1975

[54] SYSTEM FOR IMPROVING THE RELIABILITY OF INDICATOR ARRANGEMENTS

[75] Inventor: Paul Joseph Merk, Chomedey, Quebec, Canada

[73] Assignee: Canadian Marconi Company, Montreal, Quebec, Canada

[22] Filed: May 24, 1973

[21] Appl. No.: 363,555

[52] U.S. Cl.......... 340/166 EL; 315/169 R; 340/210
[51] Int. Cl. .............................................. H04q 1/28
[58] Field of Search ..... 340/166 EL, 324 R, 324 M, 340/210, 212, 380; 315/169 R

[56] References Cited
UNITED STATES PATENTS
3,719,940   3/1973   Lay et al. .................... 340/324 M Primary Examiner—Marshall M. Curtis
Attorney, Agent, or Firm—Alan Swabey; Robert E. Mitchell

[57] ABSTRACT

This invention relates to a system for improving the reliability of indicators which contain illuminable paths used as indication means. The illuminable paths consist of a series of light sources sequentially arranged and adapted to be turned on and off in sequence to give the impression of a moving line of light. This light is adjacent to a scale on the indicator, and the end of the moving line indicates a value detected by a sensor. In accordance with the invention, a system for improving the reliability of such indicators includes a plurality of n power supplies for energizing the light sources. Each power supply is adapted to energize each nth light source. Thus, with two power supplies, each supply is adapted to energize every second light source, and with three, each supply is adapted to energize each third light source. If one of the power supplies fails, then the only loss which will be suffered is a loss of resolution of the reading on the indicator. This is an improvement over systems using only one power supply in which failure of the power supply leads to a complete loss of the indicator.

9 Claims, 5 Drawing Figures

SYSTEM FOR IMPROVING THE RELIABILITY OF INDICATOR ARRANGEMENTS

BACKGROUND OF THE INVENTION

1. Field of the Invention

This invention relates to a system for improving the reliability of indicators comprising illuminable paths used as indication means wherein each illuminable path comprises a series of light sources sequentially arranged and adapted to be turned on and off in sequence. More specifically this invention relates to a power supply arrangement for such indicators which increases their reliability.

2. Description of the Prior Art

Indicators comprising such illuminable paths consisting of a series of light sources arranged in sequential fashion are described in U.S. Pat. No, 3,726,320 issued Apr. 10, 1973 (Inventor: P. J. Merk) and U.S. patent application Ser. No. 333,405 filed Feb. 16, 1973 (Inventor: M. Kwong).

The paths in these displays are powered from a single power supply so that if the power supply fails the readings on the indicators will be completely lost. The consequence of such a loss when the indicators are used in aircraft and the loss occurs during a flight are, of course, very severe.

The normal present method of preventing such a loss is to provide a stand-by power supply which would take over in the event of a failure of the primary power supply. For example consider the case of a four engine aircraft in which the instruments pertaining to each engine are powered by separate power supplies. To provide stand-by power for each individual set of instruments would require four additional power supplies of output capability equal to that of the primary power supplies, and four individual switching systems. Thus to provide simple redundancy would cost eight power supplies and four switching systems. This solution is not optimal for the following reasons:

a. The extra power supplies impose the burdens of additional weight, extra space requirement, and extra cost.

b. The switching systems and the auxiliary power supplies are themselves subject to failure which reduces the overall reliability.

SUMMARY OF THE INVENTION

It would therefore be desirable to have a system which is not subject to the above disadvantages. Specifically, it would be desirable to have a system wherein the additional weight, space and cost requirements are kept low. It would also be desirable to eliminate the requirement for a power supply switching system, and to keep costs low by eliminating the costs of a duplicate of the primary power supply.

In the case of the four engine aircraft this invention proposes to connect all four primary power supplies to sequentially alternate light sources in the indicators of all four individual engines. Thus power supply 1 would energize light sources 1, 5, 9, 13 — in all four indicators while power supply 2 would energize light sources 2, 6, 10, 14 — etc., and all four power supplies would be constantly supplying power to all four sets of indicators. Suppose that power supply 2 fails. Then light sources 2, 6, 10, 14 — on all sets of indicators would be extinguished, but light sources 1, 3, 4, 5, 7, 8, 9, 11, 12, 13 — would remain energized on all sets of indicators. This would result in only a slight decrease in the resolution of the indicators for all four engines and no total loss in any of them. This system provides triple redundancy for all four sets of indicators without the addition of any auxiliary power supplies or switching systems and the attendant weight, space, and cost burdens.

To make the application of this principle more general it is necessary to consider $n$ sets of indicators energized by $n$ power supplies. In this case power supply 1 would energize light sources 1, $n+1$, $2n+1$, $3n+1$, —; power supply 2 would energize light sources 2, $n+2$, $2n+2$, $3n+2$, —; power supply $n$ would energize light sources $n$, $2n$, $3n$ —, on all $n$ sets of indicators. If one power supply should fail, the same percentage of light sources would be extinguished on all indicators, namely $(1/n)$th, but none of the indicators would be entirely extinguished. By observing the spacing of the extinguished lights, the pilot can immediately judge the extent of his uncertainty regarding the actual value of the parameter he is attempting to read, and need only be concerned about it if the last extinguished light is coincident with the value which should be read. As a very simple example take the case of an altimeter in which each light source and fibre optic section represents 100 ft., the actual aircraft altitude is about 2,300 ft., $n = 4$, and power supply number 3 fails. Light sources 3, 7, 11, 15, 19, 23 are extinguished while all others up to and including 20, 21, 22 remain energized. The pilot's only uncertainty is whether he is at 2,200 or 2,300 ft., and the maximum extent of his uncertainty is 100 ft., because he can always increase his altitude to 2,400 ft., as a test and this value will be properly indicated.

The light sources can comprise incandescent light bulbs, light emitting diodes or any other light source which uses electrical power.

The illuminable paths usually are used as indication means in the indicators.

BRIEF DESCRIPTION OF THE DRAWINGS

The invention will be better understood by an examination of the following description together with the accompanying drawings in which.

DETAILED DESCRIPTION OF THE DRAWINGS

Figure 1:
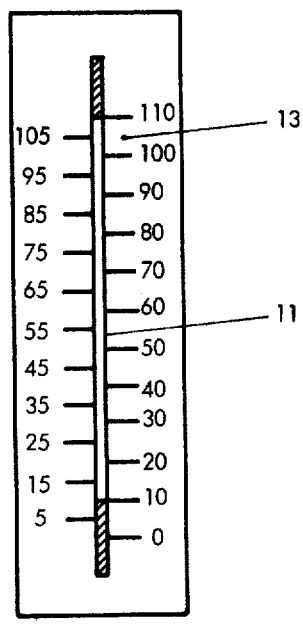
FIG. 1 illustrates an illuminable path being used as a scale indication means.
Figure 2:
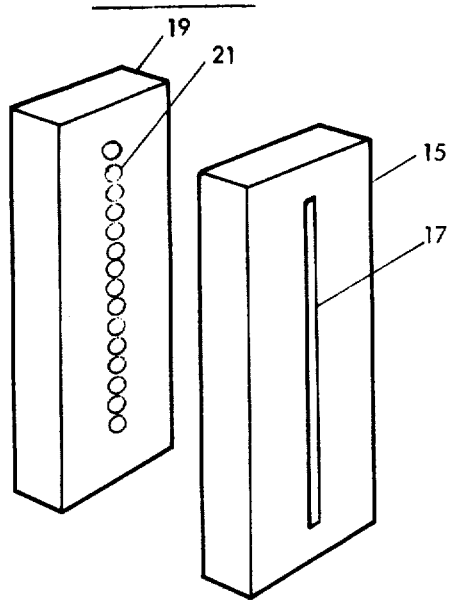
FIG. 2 is an exploded view of an illuminable path showing its construction.

Referring to FIG. 1, an illuminable path 11 is used as an indication means for the scale 13. As described in the above-mentioned patent applications, all of the light sources up to the value to be indicated on the scale are energized so that the value indicated on the scale is adjacent to the top of the illuminated portion of the illuminable path. As can be seen in FIG. 2, the illuminable path is housed in a container 15 which includes an opening 17. The opening 17 may comprise either fibre optic strands or a sheet of fibre optic material to make up the illuminable path.

A mounting means 19 carries the light sources 21 for illuminating the path. As will be obvious, the mounting means will be inserted in the container 15 so that the light sources are adjacent to the opening with the fibre optic material. The impression of a moving path of light is given by switching the light sources on and off in sequence. When switching the light sources on, the lowermost unlit source is the first one energized and this is followed by the next source up which is in turn followed by the third unlit source and so on. All sources up to the last source energized are kept energized, i.e., the line of light will extend from the bottom source to the topmost energized source.

When switching off, the uppermost energized light is first switched off and this is followed by the light immediately below it and so forth. As will be clear, the lights will be switched on in sequential fashion to indicate an increasing value on the scale, while the lights will be switched off in sequential fashion to indicate a decreasing value on the scale.

As mentioned above, the power for energizing the light sources (not shown in FIGS. 1 and 2) is presently provided from a single power supply. The power is supplied to the light sources through a switching arrangement or logic unit (neither is shown in FIGS. 1 and 2) which arrangement or unit will respond to an input from a transducer to insure that the appropriate number of sources are energized so that the illuminable path indicates the value as detected by the transducer.

Figure 3:
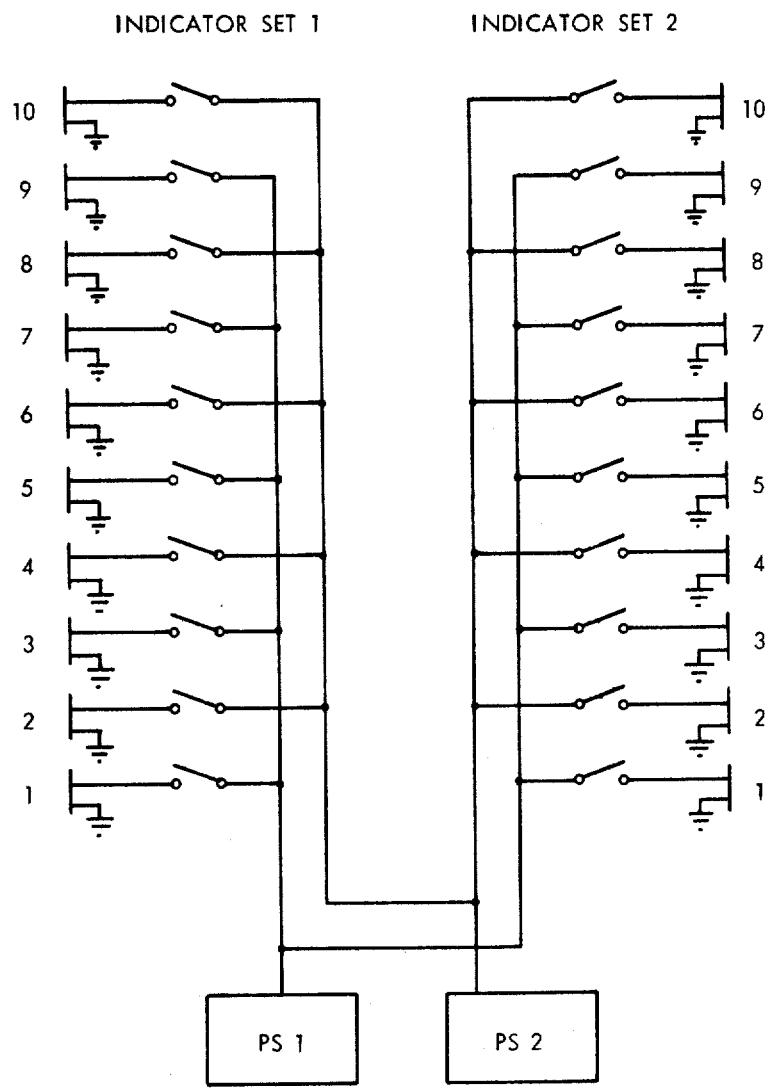
FIG. 3 illustrates one embodiment of a power supply arrangement for the light sources of illuminable paths in accordance with the invention.

To provide the simplest illustration of the principle of this invention, consider a two engine aircraft with two sets of indicators and two power supplies, that is $n = 2$. Referring to FIG. 3, power supplies (PS) 1 and 2 are each providing the same amount of power they would if they were connected only to their respective indicator sets 1 and 2. PS1 supplies energy to light sources 1, 3, 5, 7, 9 on both indicator sets while PS2 supplies energy to light sources 2, 4, 6, 8, 10 on both indicator sets. If one power supply fails, both indicator sets continue to receive energy for half of the light sources, thus providing simple redundancy without the addition of extra power supplies or switching systems. The switches shown in FIG. 3 at each light source are controlled by the sensors and have no part in this argument.

Figure 4:
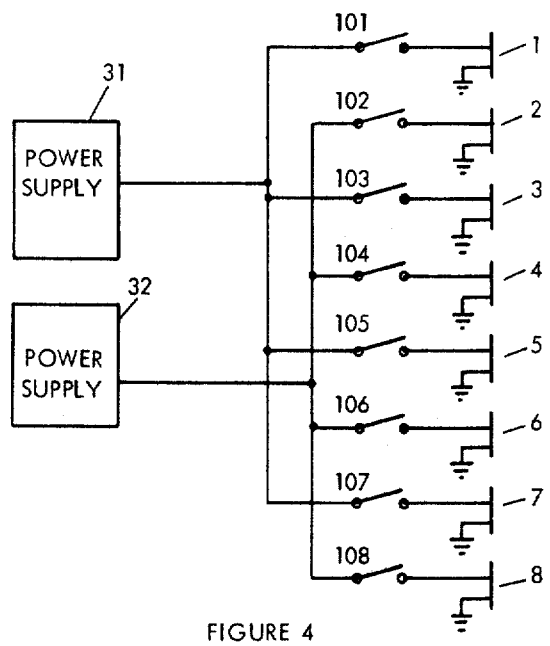
FIG. 4 illustrates a second embodiment of a power supply arrangement for the light sources of an illuminable path in accordance with the invention.

FIG. 4 illustrates an embodiment using two power supplies to provide redundancy for a single indicator. The light sources are energized through switches controlled by a logic unit or other control device not shown in FIG. 4. Each power supply will have to supply only half the amount of power which would have to be supplied by a single power supply unit as each power supply in the novel arrangement energizes only half the number of light sources that a single power supply would energize. Extending this notion, it becomes clear that, when n power supplies are used, each one will have to supply only 1/nth the amount of power supplied by a single power supply. This will, of course, mean that each one of the power supplies will be smaller and less expensive than the one power supply, however, the total weight, cost and space requirements for all of the power supplies will, no doubt, exceed the weight, cost and space requirement of the one power supply.

Referring now to FIG. 4, power supply 31 is adapted to energize the odd numbered light sources 1, 3, 5 and 7 through the odd numbered switches 101, 103, 105 and 107. Power supply 32 is adapted to energize the even numbered sources 2, 4, 6 and 8 through the even numbered switches 102, 104, 106 and 108. The switches are under the control of a control device not shown in FIG. 4 to sequentially switch the sources on or off in response to transducer readings or the like.

As can be seen, with this system the reliability is increased because of the additional power supply or supplies. This is accomplished without means for switching the power supplies. Furthermore, as each supply provides less power, each one is less expensive, lighter and less space consuming than the one power supply so that this solution differs substantially from the solution of providing mere duplicates of the primary power supply. The cost in performance for all of these advantages is a reduction in resolution in the event of failure of one of the supplies.

Figure 5:
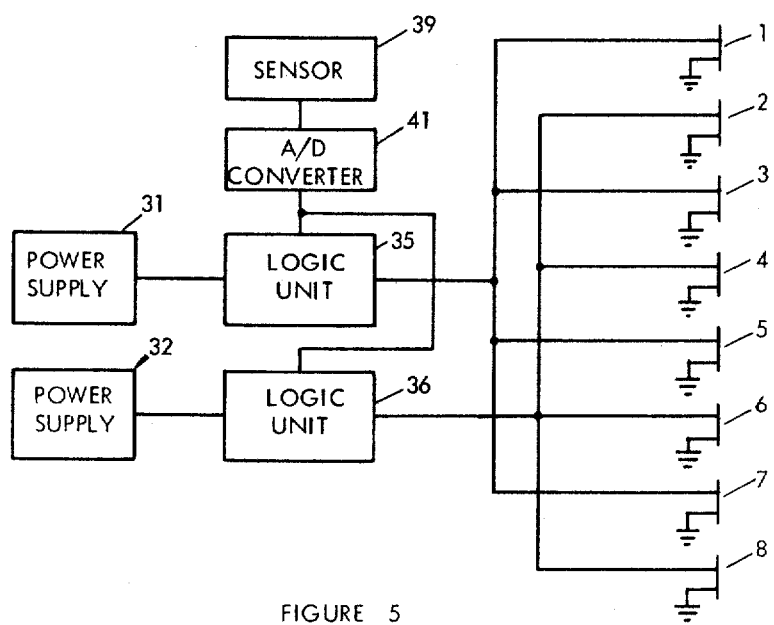
FIG. 5 illustrates a third embodiment of a power supply arrangement for the light sources of an illuminable path in accordance with the invention.

FIG. 5 illustrates a more practical embodiment of the invention. In FIG. 5, power supply 31 again is adapted to energize the odd numbered sources while power supply 32 is adapted to energize the even numbered ones. However, in this case, the power supplies 31 and 32 are fed to their respective sources through logic units 35 and 36 respectively. The logic units are under the control of Analogue/Digital (A/D) converter 41 which is, in turn, fed from sensor 39. The analogue value sensed by the sensor is converted to a coded digital value by the converter 41. The code drives the logic units to insure that the correct number of sources are switched on to indicate the value sensed by the sensor on an indicator scale.

Although several embodiments have been described, this was for the purpose of illustrating, but not limiting, the invention. Various modifications, which will come readily to the mind of one skilled in the art, are in the scope of the invention as defined in the appended claims.

I claim:

1. A system for improving the reliability of indicators; each indicator comprising an illuminable path;
each illuminable path comprising a series of light sources sequentially arranged and adapted to be turned on and off in sequence;
said system comprising;
a plurality of n separate power supplies for continuously energizing said light sources;
the number of light sources in each series being greater than $n$;
the 1st, 2nd, 3rd, . . . $n$th power supplies being respectively adapted to energize the 1st, 2nd, 3rd . . . $n$th sources in each series;
the 1st power supply being further adapted to energize the $n+1$st, $2n+1$st, $3n+1$st . . . sources in each series;
the 2nd power supply being further adapted to energize the $n+2$nd, $2n+2$nd, $3n+2$nd . . . sources in each series;
the 3rd power supply being further adapted to energize the $n+3$rd, $2n+3$rd, $3n+3$rd . . . sources in each series;

.

.

.

the $n$th power supply being further adapted to energize the $2n$th, $3n$th, $4n$th . . . sources in each series.

2. A system as defined in claim 1 wherein said indicator comprises a viewing face; and wherein said illuminable path comprises fibre optic means on said viewing face; and scale means adjacent to said illuminable path.

3. A system as defined in claim 2 wherein said light sources comprise light emitting diodes (LED's).

4. A system as defined in claim 2 wherein said light sources comprise incandescent light bulbs.

5. A system as defined in claim 3 wherein said power supplies are connected to their respective light sources through switch means.

6. A system as defined in claim 4 wherein said power supplies are connected to their respective light sources through switch means.

7. A system as defined in claim 3 wherein said power supplies are connected to their respective light sources through digital logic means; said logic means being controlled by an analogue/digital converter; said analogue/digital converter being fed from a sensor means.

8. A system as defined in claim 4 wherein said power supplies are connected to their respective light sources through digital logic means; said logic means being controlled by an analogue/digital converter; said analogue/digital converter being fed from a sensor means.

9. A system for improving the reliability of indicators, each indicator comprising a viewing face and an illuminable path comprising fibre optic means on the viewing face, and scale means adjacent to said illuminable path;
   each illuminable path comprising a series of light emitting diode light sources sequentially arranged and adapted to be turned on and off in sequence;
   said system comprising;
   first and second power supplies for continuously energizing said light sources;
   the number of light sources in each series being greater than 2;
   the first power supply being adapted to energize the odd numbered sources in each series;
   the second power supply being adapted to energize the even numbered sources in each series.

* * * * *